(12) United States Patent
Shintani

(10) Patent No.: US 11,616,915 B2
(45) Date of Patent: Mar. 28, 2023

(54) APPARATUS AND METHOD THEREOF, AND STORAGE MEDIUM FOR DETECTING A CHANGE IN EXTERNAL LIGHT THAT OCCURS DURING SHOOTING AN IMAGE

(71) Applicant: CANON KABUSHIKI KAISHA, Tokyo (JP)

(72) Inventor: Takuya Shintani, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/321,182

(22) Filed: May 14, 2021

(65) Prior Publication Data
US 2021/0368089 A1    Nov. 25, 2021

(30) Foreign Application Priority Data
May 19, 2020   (JP) .............................. JP2020-087603

(51) Int. Cl.
| | | |
|---|---|---|
| *H04N 5/235* | (2006.01) | |
| *G03B 5/00* | (2021.01) | |
| *G02B 27/64* | (2006.01) | |
| *H04N 5/232* | (2006.01) | |

(52) U.S. Cl.
CPC ......... *H04N 5/2357* (2013.01); *G02B 27/646* (2013.01); *G03B 5/00* (2013.01); *H04N 5/23287* (2013.01); *G03B 2205/0007* (2013.01)

(58) Field of Classification Search
CPC ............ H04N 5/2357; H04N 5/23287; G02B 27/646; G03B 5/00; G03B 2205/0007
See application file for complete search history.

(56) References Cited

U.S. PATENT DOCUMENTS

| | | | | |
|---|---|---|---|---|
| 9,648,249 | B2* | 5/2017 | Sugawara | ............ H04N 5/2353 |
| 9,979,898 | B2* | 5/2018 | Tsukagoshi | ............ G06V 10/42 |
| 11,080,863 | B2* | 8/2021 | Shintani | .................. G06T 7/248 |
| 2015/0138392 | A1* | 5/2015 | Sugawara | ............ H04N 5/2353 |
| | | | | 348/226.1 |
| 2017/0142315 | A1* | 5/2017 | Tsukagoshi | ............ G06V 10/42 |
| 2018/0182110 | A1* | 6/2018 | Shintani | ............... H04N 5/2351 |

FOREIGN PATENT DOCUMENTS

| | | |
|---|---|---|
| JP | 2010-091792 A | 4/2010 |
| JP | 2015-092660 A | 5/2015 |

* cited by examiner

*Primary Examiner* — Nicholas G Giles
(74) *Attorney, Agent, or Firm* — Canon U.S.A., Inc. IP Division

(57) ABSTRACT

An apparatus comprises: a sensor that shoots a subject and outputs an image; a shift unit that shifts a position on the sensor of an image of the subject incident on the sensor; and a detection unit that detects flicker based on partial images in a same partial region of a plurality of images consecutively obtained from the sensor. In a case where the sensor shoots the plurality of images while the shift unit is shifting the position of the image of the subject, the detection unit selects the partial region so that a change of the image of the subject in the partial region caused by the shift becomes small between the plurality of images.

19 Claims, 14 Drawing Sheets

FIG. 7

|  | Xb(n) | | | |
|---|---|---|---|---|
| n | 1 | 2 | 3 | 4 |
| 1 | (Xb1,Yb1) | (Xb2,Yb1) | (Xb3,Yb1) | (Xb4,Yb1) |
| 2 | (Xb1,Yb2) | (Xb2,Yb2) | (Xb3,Yb2) | (Xb4,Yb2) |
| 3 | (Xb1,Yb3) | (Xb2,Yb3) | (Xb3,Yb3) | (Xb4,Yb3) |
| 4 | (Xb1,Yb4) | (Xb2,Yb4) | (Xb3,Yb4) | (Xb4,Yb4) |

Yb(n)

APPARATUS AND METHOD THEREOF, AND STORAGE MEDIUM FOR DETECTING A CHANGE IN EXTERNAL LIGHT THAT OCCURS DURING SHOOTING AN IMAGE

BACKGROUND OF THE DISCLOSURE

Field of the Disclosure

The aspect of the embodiments relates to an apparatus and method thereof, and a storage medium, and more specifically to a technique for detecting a change in external light (flicker) that occurs during shooting an image.

Description of the Related Art

In recent years, the sensitivity of image capturing apparatuses such as digital cameras and mobile phones has been increasing. Accordingly, even in a relatively dark environment such as indoors, it has become possible to acquire a bright image with suppressed blurring by shooting with a high shutter speed (shortened exposure period). Further, under the lighting by fluorescent lamps and LED lighting, which are widely used as indoor light sources, flicker, which is a phenomenon in which the illumination light fluctuates periodically due to the influence of the frequency of a commercial power source, occurs.

When shooting with a high shutter speed under a light source that produces such flicker (hereinafter referred to as "flicker light source"), exposure unevenness and color unevenness may occur in one image, or exposure unevenness and color temperature unevenness may occur between a plurality of images which are shot continuously.

To cope with this, Japanese Patent Laid-Open No. 2015-92660 discloses to divide the area of an image sensor into sub-regions, detect flicker in a second region, and prevent a flicker phenomenon occurring in an image.

On the other hand, in image capturing apparatuses such as digital cameras and mobile phones, blur correction and image stabilization technologies have advanced, and it has become possible to acquire images with suppressed blur even when the shutter speed is low. Japanese Patent Laid-Open No. 2010-91792 discloses, as methods for optically correcting camera shake and performing image stabilization, a lens type correction method performed on the lens side and an image sensor type correction method performed on the image sensor side. Regardless of which method is used, it is possible to control the blurring of the subject to be reduced by moving a lens or an image sensor in a direction that cancels out the vibration.

Image stabilization mechanisms for moving a lens and an image sensor require a calibration operation in order to perform accurate correction, and the relative movement of the subject and the image sensor during this calibration operation may affects the accuracy of flicker detection.

However, if the calibration operation and the flicker detection are exclusively controlled, the responsiveness and the real-time performance are impaired.

Further, in the prior art disclosed in Japanese Patent Laid-Open No. 2015-92660, not only the blinking of the flicker light source partially imaged on the image sensor surface cannot be detected, but also it is not possible to accurately detect the blinking of the flicker since the ambient light that changes due to the relative movement between the subject including the flicker light source and the surface of the image sensor affects the brightness change in frequency of the flicker light source.

SUMMARY OF THE DISCLOSURE

According to the aspect of the embodiments, provided is an image capturing apparatus comprising: a sensor that shoots a subject and outputs an image; a shift unit that shifts a position on the sensor of an image of the subject incident on the sensor; and a detection unit that detects flicker based on partial images in a same partial region of a plurality of images consecutively obtained from the sensor, wherein in a case where the sensor shoots the plurality of images while the shift unit is shifting the position of the image of the subject, the detection unit selects the partial region so that a change of the image of the subject in the partial region caused by the shift becomes small between the plurality of images.

Further, according to another aspect of the embodiments, provided is a method of an apparatus that comprises a sensor that shoots a subject and outputs an image and a shift unit that shifts a position on the sensor of an image of the subject incident on the sensor, the method comprising: shooting a plurality of images by the sensor while the shift unit is shifting the position of the image of the subject, selecting a same partial region of the plurality of images so that a change of the image of the subject in the partial region caused by the shift becomes small between the plurality of images; and detecting flicker based on partial images in the selected partial region of the plurality of images.

Furthermore, according to yet another aspect of the embodiments, provided is a non-transitory computer-readable storage medium, the storage medium storing a program that is executable by the computer, wherein the program includes program code for causing the computer to perform a method of an apparatus that comprises an sensor that shoots a subject and outputs an image and a shift unit that shifts a position on the sensor of an image of the subject incident on the sensor, comprising: shooting a plurality of images by the sensor while the shift unit is shifting the position of the image of the subject, selecting a same partial region of the plurality of images so that a change of the image of the subject in the partial region caused by the shift becomes small between the plurality of images; and detecting flicker based on partial images in the selected partial region of the plurality of images.

Further features of the disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the aspect of the embodiments.

FIG. 7 is a diagram showing an example of block division according to the first embodiment.

DESCRIPTION OF THE EMBODIMENTS

Figure 1:
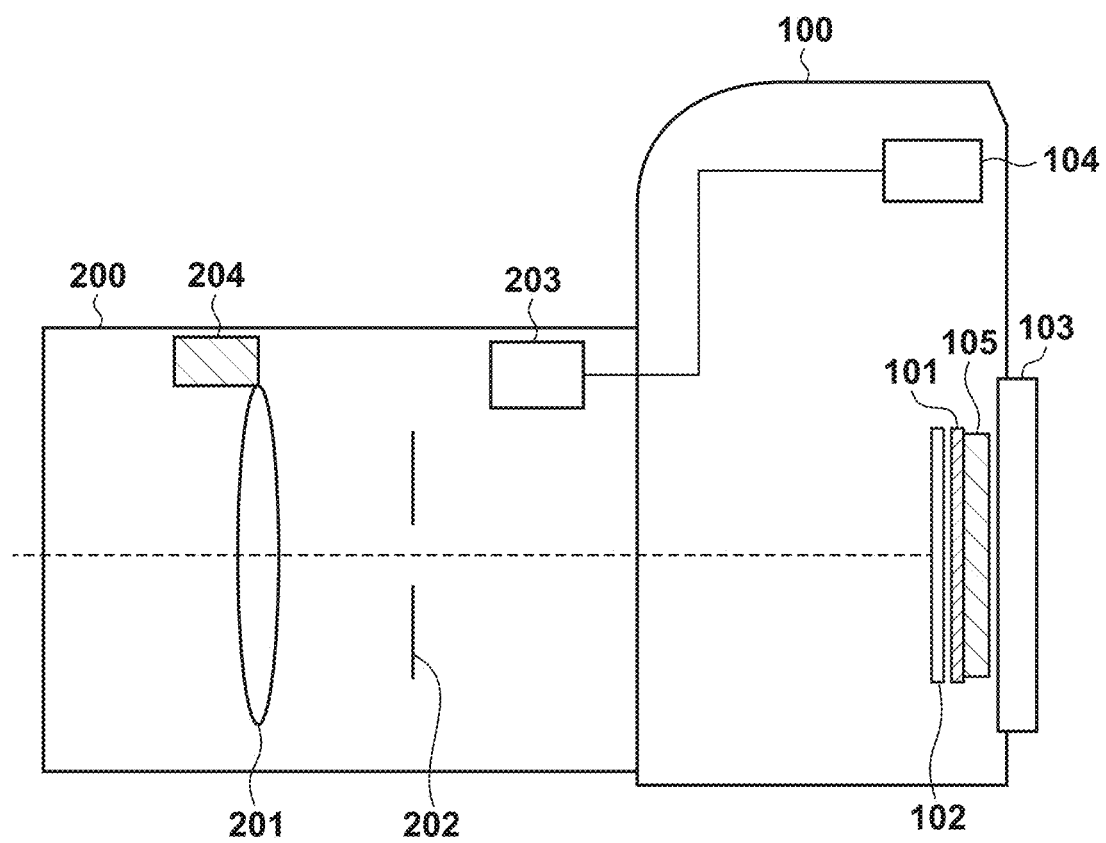
FIG. 1 is a schematic view showing a system configuration of a digital camera according to an embodiment of the disclosure.

Hereinafter, embodiments will be described in detail with reference to the attached drawings. Note, the following embodiments are not intended to limit the scope of the claimed invention, and limitation is not made to a disclosure that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a schematic view showing a system configuration of a digital camera as an example of an image capturing apparatus according to an embodiment of the disclosure. The digital camera in this embodiment includes a camera body 100 and an imaging lens 200 that can be attached to and detached from the camera body 100.

First, each part of the camera body 100 will be described.

In the camera body 100, an image sensor 101 is composed of a CCD, CMOS, or the like including an infrared cut filter, a low-pass filter, and the like, and a subject image of a subject is formed on the image sensor 101 by the imaging lens 200. The image sensor 101 photoelectrically converts the subject image and outputs an obtained image signal (image). The image captured by the image sensor 101 is displayed as a live view, is also used for detecting flicker, and is recorded as a captured image.

The exposure time of the image sensor 101 can be controlled by opening a shutter 102 for a predetermined period during shooting.

A display unit 103 is composed of, for example, a TFT liquid crystal panel or the like. At the time of framing, images acquired by the image sensor 101 are displayed in real time to realize a live view, and various shooting setting information is displayed. In addition, an image taken according to the user's operation can be displayed and confirmed by the user. Further, the display unit 103 also has a touch panel function, and the display unit 103 can be used as an operating member by, when the user touches a predetermined icon or the like displayed in advance, operating a function linked to the icon.

A CPU 104 controls each part of the camera body 100 such as the image sensor 101, the shutter 102, and the display unit 103.

An image sensor type image stabilization unit 105 has an angular velocity sensor such as a gyro sensor inside. The image sensor type image stabilization unit 105 can optically reduce image blur by moving the image sensor 101 so as to cancel the camera shake and the like by cooperating with the CPU 104 by, for example, receiving an instruction from the CPU 104.

Next, the imaging lens 200 will be described.

The imaging lens 200 includes a lens group 201 and a diaphragm 202. In the figure, the lens group 201 is represented by one lens, but it is actually composed of a plurality of lenses including a focus lens for adjusting the focus, a zoom lens for adjusting the focal length, and a correction lens for correcting camera shake, and the like. The diaphragm 202 adjusts the amount of light that goes into the camera body 100 out of the light that has passed through the lens group 201.

The CPU 203 controls each part of the imaging lens 200 (hereinafter, referred to as "LPU" for lens processing unit). In addition to controlling the lens group 201 and diaphragm 202, the LPU 203 communicates with the CPU 104 on the camera body 100 to exchange information, such as the focus position and aperture, and information at the time of performing image stabilization, with the camera body 100.

A lens type image stabilization unit 204 has an angular velocity sensor such as a gyro sensor inside, and detects and corrects camera shake with respect to two orthogonal axes such as a horizontal direction and a vertical direction. Then, the lens type image stabilization unit 204 can optically reduce image blur by moving the correction lens so as to cancel the shake due to camera shake or the like by cooperating with the LPU 203 by, for example, receiving an instruction from the LPU 203.

Figure 2:
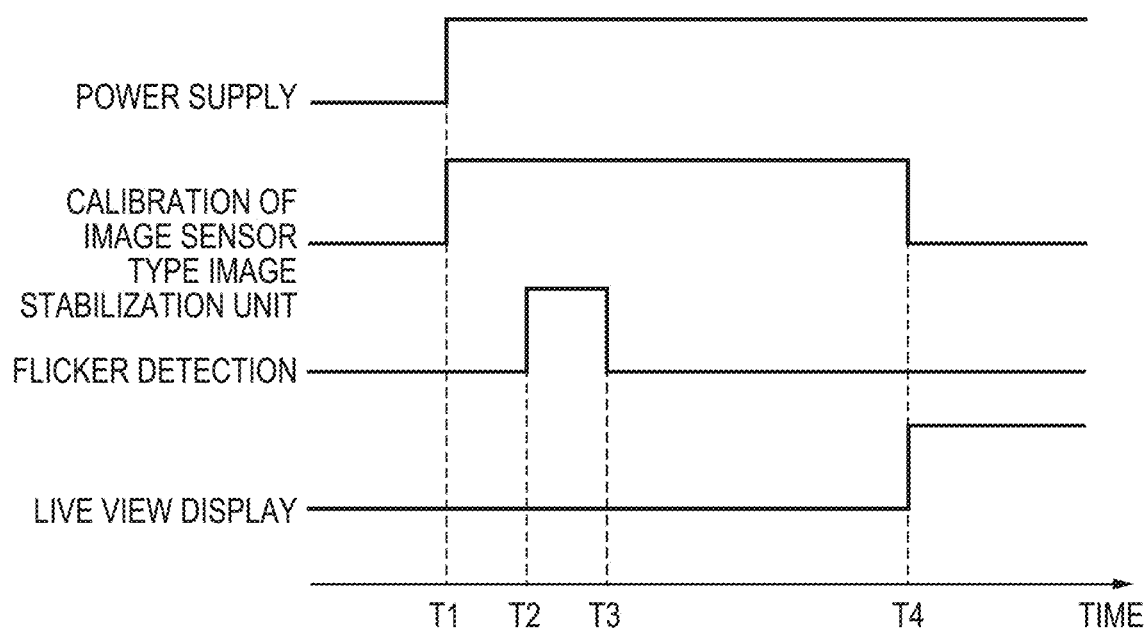
FIG. 2 is a timing chart at the time of starting the digital camera according to the embodiment.

FIG. 2 is a timing chart at the time of starting the digital camera shown in FIG. 1, and shows on/off of each operation.

First, at time T1, when the system power for starting the camera body 100 is turned on, the calibration operation for correctly controlling the image sensor type image stabilization unit 105 is started. This calibration operation is performed until time T4. The details of the calibration operation will be described later with reference to FIGS. 3A and 3B.

On the other hand, during a period from time T2 to time T3, the image sensor 101 performs shooting for flicker detection. In the present embodiment, it is assumed that the calibration operation of the image sensor type image stabilization unit 105 requires a longer time than the time for performing the shooting for flicker detection. Therefore, the time until the live view display is started is shortened by performing the shooting for flicker detection in parallel with the calibration operation. Accordingly, the shooting for flicker detection is performed at an arbitrary timing, such as the above-mentioned period from time T2 to time T3, within the period from time T1 to time T4 during which the calibration operation is performed. The timing for performing the shooing for flicker detection will be described later with reference to FIG. 4.

Further, at time T4, after the calibration operation is completed, the live view display of images captured by the image sensor 101 is started on the display unit 103.

Figure 3B:
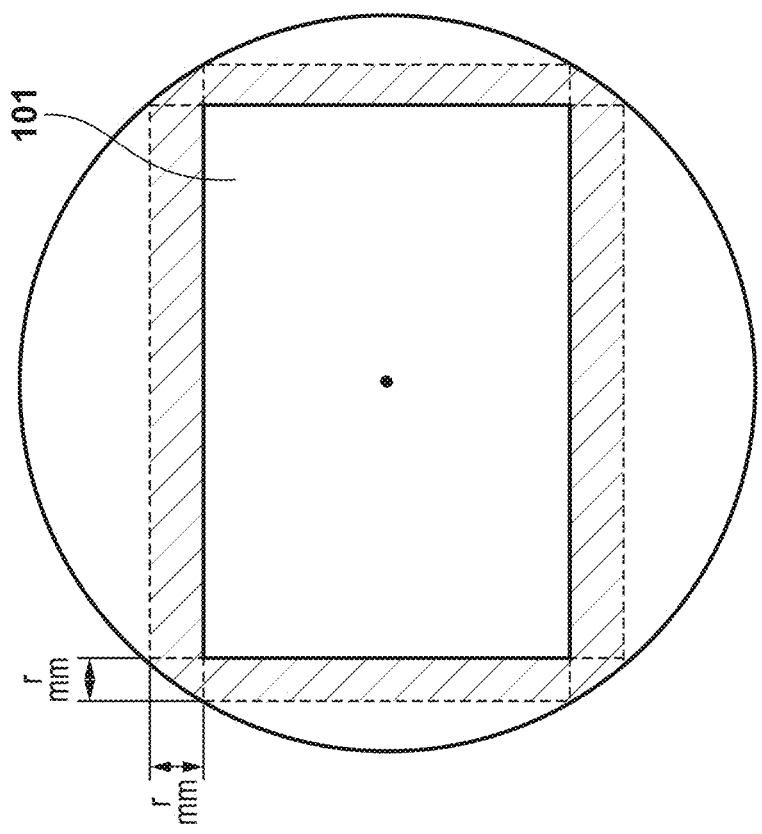
FIGS. 3A and 3B are explanatory views of a calibration operation of an image sensor type image stabilization unit according to the embodiment.
Figure 3A:
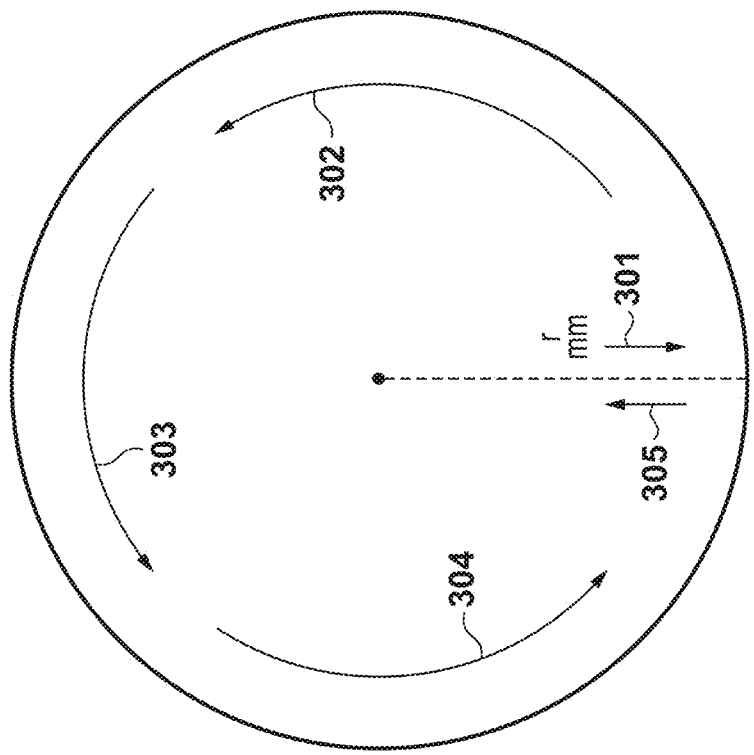

FIGS. 3A and 3B are explanatory views of the calibration operation of the image sensor type image stabilization unit 105 in this embodiment. In FIG. 3A, a shaded area shows an area where the image sensor 101 moves during the calibration operation (during the shift) by being driven by the image sensor type image stabilization unit 105. In this way, it is assumed that the image sensor 101 shifts in a circle with the dotted lines which are the positions shifted by r mm in the vertical and horizontal directions from the center as the maximum positions of the shift.

FIG. 3B shows the operation of the image sensor type image stabilization unit 105 during the calibration operation, and it is assumed that the image sensor type image stabilization unit 105 shifts along a circle through the states of arrows 301 to 305. The start time T1 of the calibration operation of the image sensor type image stabilization unit 105 shown in FIG. 2 is the start state indicated by the arrow 301, and the end time T4 of the calibration operation of the image sensor type image stabilization unit 105 shown in FIG. 2 is the end state indicated by the arrow 305, both move r mm in a straight line. In the state indicated by the arrows 302 to 304, the image sensor type image stabilization unit 105 shifts along the circle in the counterclockwise direction in the period from time T1 to time T4.

Figure 4:
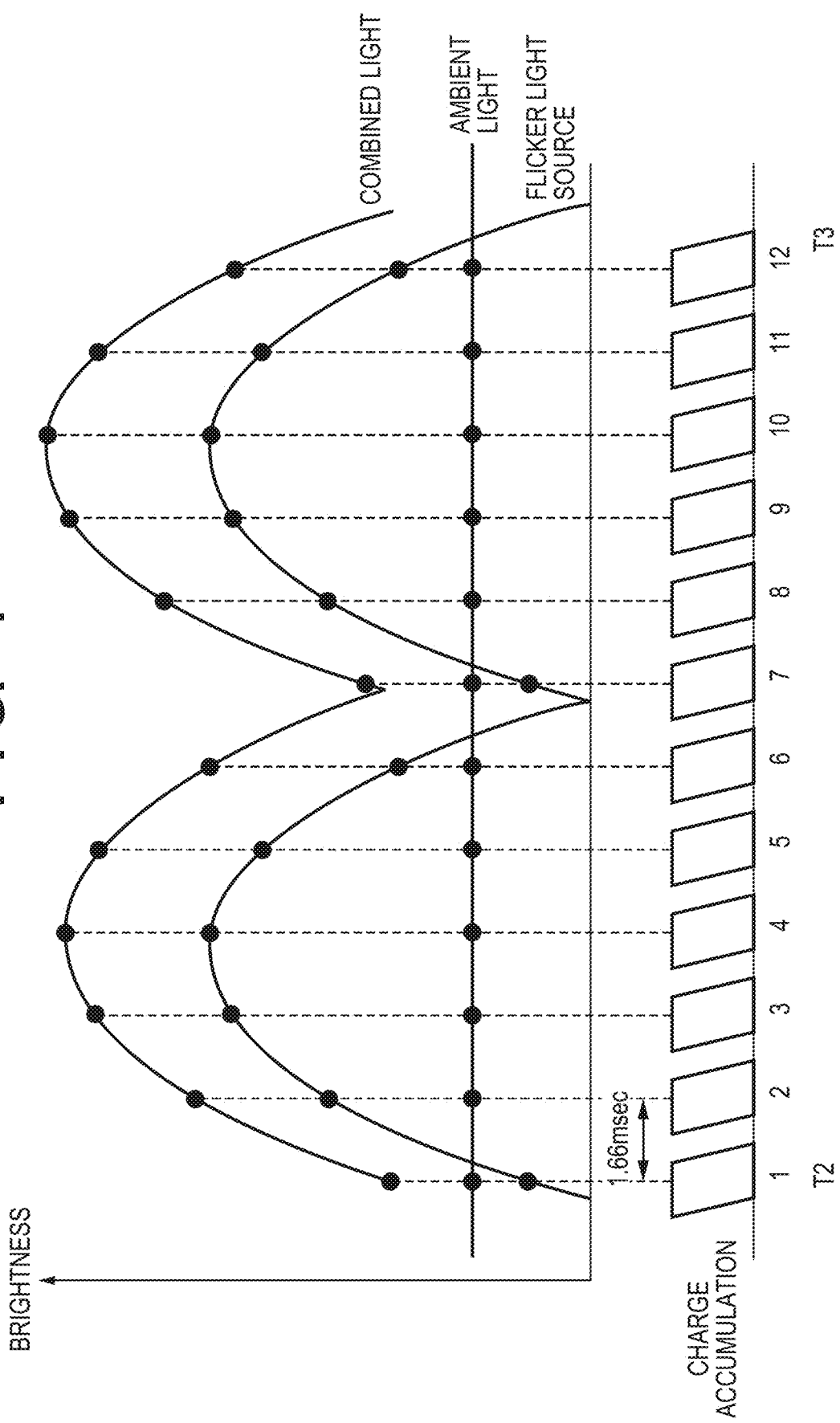
FIG. 4 is an explanatory diagram of a shooting timing for flicker detection according to the embodiment.

FIG. 4 is an explanatory diagram of a shooting timing for flicker detection in the present embodiment, and shows a case where shooting is performed at 600 fps as an example. In the present embodiment, in order to determine the blinking cycle of the flicker that repeats blinking due to the alternating current, 12 frames of images are continuously shot by the image sensor 101 with a charge accumulation period of 1.66 msec.

As shown in FIG. 4, under the flicker light source, the combined light of the ambient light and the light from the flicker light source is incident on the image sensor 101, and the electric charge is accumulated. If the images of a plurality of frames captured continuously are images of the same subject, it is assumed that the ambient light has not changed, and the change in brightness between frames should be due to the periodic fluctuation of the flicker light source. Flicker detection is performed by detecting the change in brightness due to this periodic fluctuation, and in the present embodiment, control is made in consideration of the influence of ambient light that changes with respect to the relative movement between the subject and the image sensor 101 caused by the calibration operation of the image sensor type image stabilization unit 105.

Further, the start time T2 of the shooting operation for flicker detection shown in FIG. 2 corresponds to the start timing of the accumulation 1 of the first frame, and the end time T3 of the shooting operation for flicker detection corresponds to the end timing of the accumulation 12 of the $12^{th}$ frame. Using these 12 frames of continuous images, an operation for determining the presence or absence of flicker and the peak intensity of the light source is performed. Generally, the frequency of a flicker light source is either 100 Hz or 120 Hz, which is twice the frequency of the commercial power supply, 50 Hz or 60 Hz. In a case where the charge accumulation period is set to 1.66 msec. as in the present embodiment, 12 frames of images captured during about 20 msec. are used, and by determining the time-series change in brightness from the photometric calculation result of the selected photometric region, the presence or absence of flicker and the peak intensity of the light source can be detected at both 100 Hz and 120 Hz.

Since the presence or absence of flicker and the method of detecting the peak intensity of the light source are known techniques, the details thereof will be omitted. However, since the ambient light changes due to the relative movement between the subject and the image sensor 101 caused by the calibration operation of the image sensor type image stabilization unit 105, the method of selecting the photometric region to reduce the effect of the change is described below.

First Embodiment

The outline of the flicker detection processing at the time of the calibration operation of the image sensor type image stabilization unit 105 in the first embodiment will be described with reference to a flowchart shown in FIG. 5.

First, in step S501, it is determined whether or not the system power is turned on. If it is not determined that the power is turned on, the determination in step S501 is repeated, and if it is determined that the power is turned on, the process proceeds to step S502.

In step S502, the calibration operation of the image sensor type image stabilization unit 105 described with reference to FIGS. 2, 3A and 3B is started. Next, in step S503, as described with reference to FIGS. 2 and 4, 12 frames of images are captured at 600 fps, and an evaluation value acquisition process for acquiring an evaluation value from the obtained 12 frames of images is performed. The evaluation value acquisition process will be described later with reference to FIGS. 6 and 7.

Next, in step S504, a region selection flicker detection process of selecting a photometric region and detecting the flicker is performed. The details of this region selection flicker detection process will be described later with reference to FIGS. 8, 9A and 9B.

Next, in step S505, it is determined whether or not the calibration operation of the image sensor type image stabilization unit 105 is completed. If it is not determined that the calibration operation is completed, step S505 is repeated. If it is determined that the calibration operation is completed, the process proceeds to step S506.

In step S506, a live view display process of sequentially displaying the images captured by the image sensor 101 on the display unit 103 is performed.

Next, in step S507, the presence or absence of flicker is determined using the result of the region selection flicker detection process performed in step S504. If it is determined that flicker is occurring, a flicker warning display process is performed to display a warning on the display unit 103 that flicker has been detected in step S508, and if it is determined that flicker is not occurring, the process ends.

Next, the evaluation value acquisition process performed in step S503 of FIG. 5 will be described with reference to the flowchart shown in FIG. 6.

Figure 5:
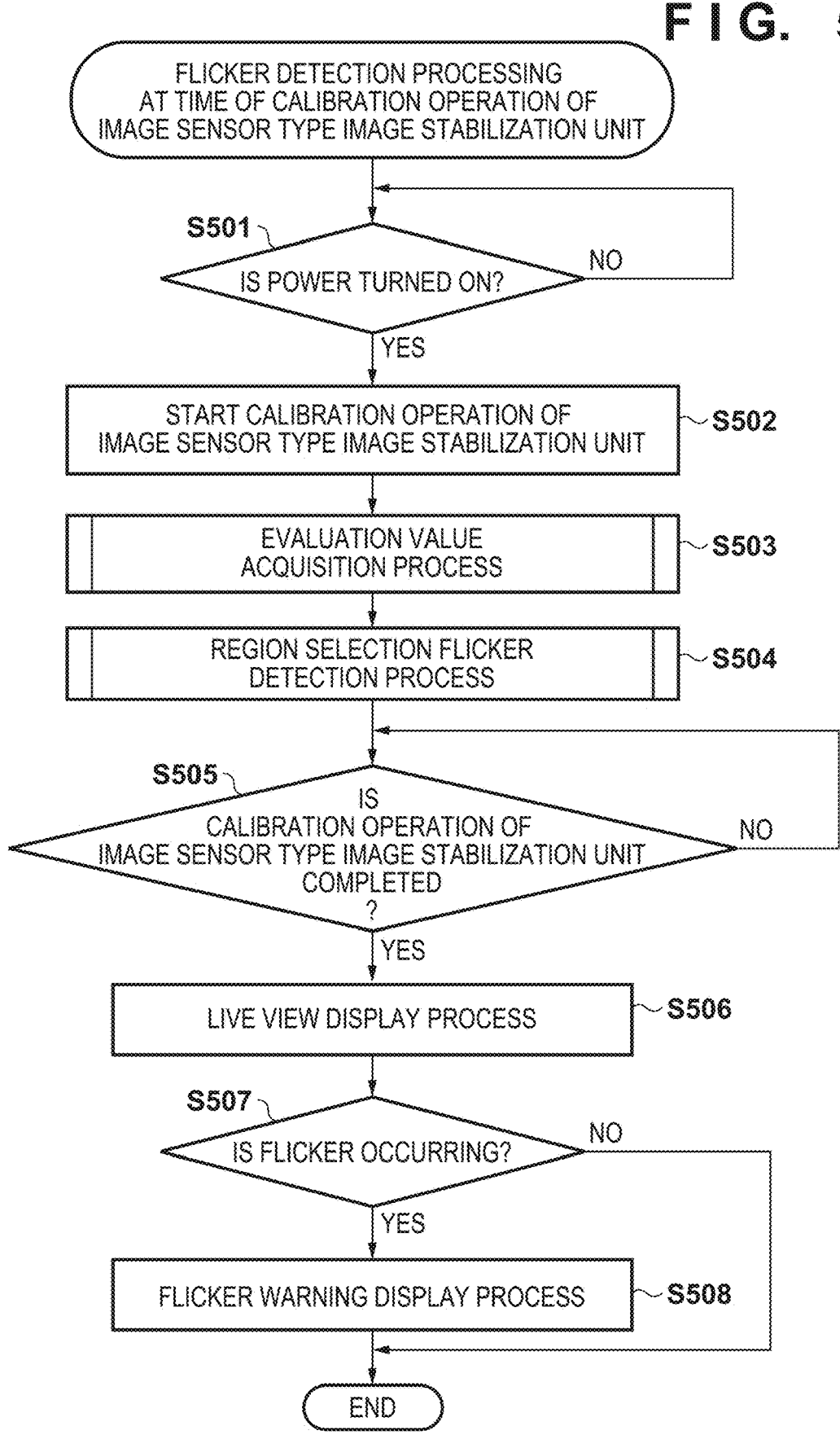
FIG. 5 is a flowchart showing an outline of a flicker detection processing during a calibration operation of the image sensor type image stabilization unit according to a first embodiment.

First, in step S601, the CPU 104 acquires a coordinate position indicating the current position of the image sensor 101 shifted by the calibration operation of the image sensor type image stabilization unit 105 started in step S502 of FIG. 5. The coordinate position of the image sensor 101 at the start of the evaluation value acquisition process acquired here is used for the region selection flicker detection process described later with reference to FIG. 8.

Next, in step S602, as described with reference to FIG. 4, the image sensor 101 performs a charge accumulation process with the charge accumulation period of 1.66 msec., and performs a readout process in step S603. Next, in step S604, the read image is divided into a plurality of blocks, and the evaluation value of the illuminance is acquired for each of the divided blocks. The evaluation value of each block acquired here is used in the region selection flicker detection process described later with reference to FIG. 8. FIG. 7 shows an example of dividing the image into 16 blocks of 4×4 as an example of the block division. In the following description, it will be described as the image being divided into 4×4 blocks, but the number of divisions is not limited to 4×4.

Next, in step S605, it is determined whether or not the shooting and processing for 12 consecutive frames of images have been completed by the processes of steps S602, S603, and S604. If it is not determined that the shooting and processing for 12 frames of images have been completed, the process returns to step S602 and the above-mentioned processes are repeated. If it is determined that the shooting and processing for 12 frames of images have been completed, the process proceeds to step S606.

In step S606, the CPU 104 acquires the coordinate position indicating the current position of the image sensor 101 shifted by the calibration operation of the image sensor type image stabilization unit 105 started in step S502, and ends the process. The coordinate position of the image sensor 101 acquired here at the end of the evaluation value acquisition process is used for the region selection flicker detection process described later with reference to FIG. 8.

Figure 8:
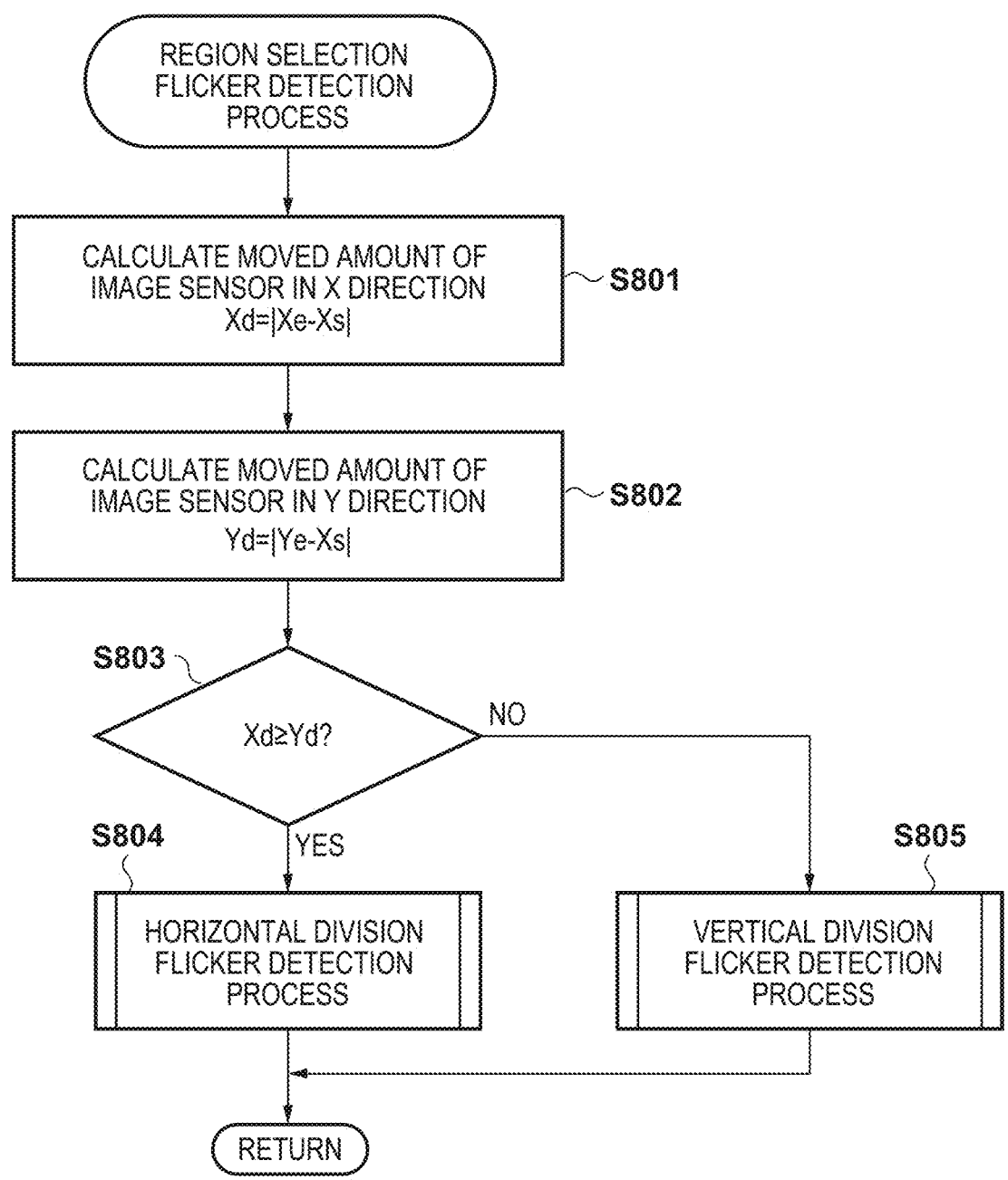
FIG. 8 is a flowchart of a region selection flicker detection process according to the first embodiment.

Next, the region selection flicker detection process performed in step S504 of FIG. 5 will be described with reference to the flowchart shown in FIG. 8.

Figure 6:
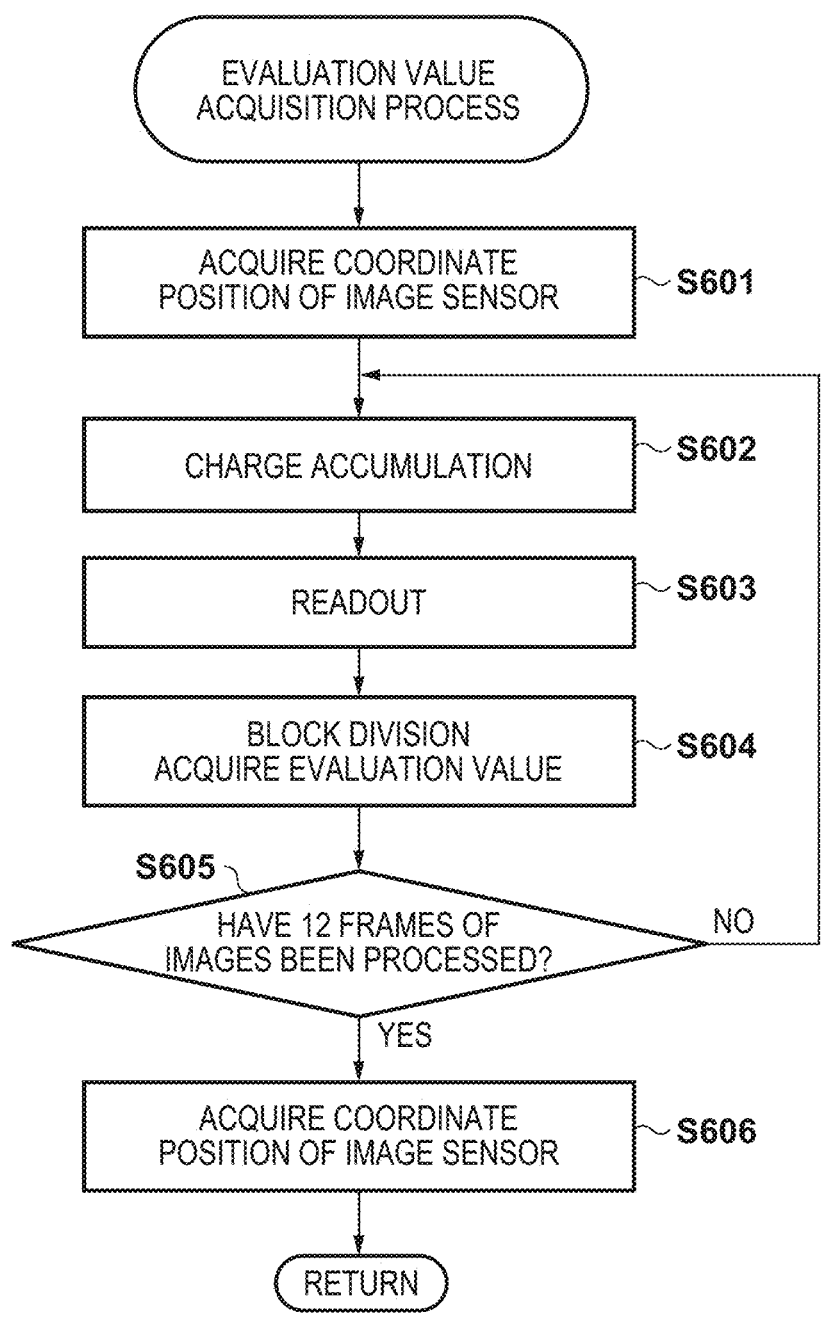
FIG. 6 is a flowchart of an evaluation value acquisition process according to the first embodiment.

First, in step S801, from the coordinates (Xs, Ys) of the image sensor 101 acquired at the start of the evaluation value acquisition process and the coordinates (Xe, Ye) of the image sensor 101 acquired at the end of the evaluation value acquisition process, which were acquired in step S601 and step S606 of FIG. 6, respectively, how much the image sensor 101 has moved in the X-axis direction during the evaluation value acquisition process is calculated. The moved amount Xd in the X direction is obtained by $$Xd=|Xe-Xs|.$$

Next, in step S802, from the coordinates (Xs, Ys) of the image sensor 101 acquired at the start of the evaluation value acquisition process and the coordinates (Xe, Ye) of the image sensor 101 acquired at the end of the evaluation value acquisition process, how much the image sensor 101 has moved in the Y-axis direction during the evaluation value acquisition process is calculated. The moved amount Yd in the Y direction is obtained by $$Yd=|Ye-Ys|.$$

Next, in step S803, the moved amount Xd in the X direction and the moved amount Yd in the Y direction obtained in steps S801 and S802 are compared. This is for determining whether the image sensor 101 has moved more in the X direction or in the Y direction (shift direction), and examples will be described with reference to FIGS. 9A and 9B.

Figure 9B:
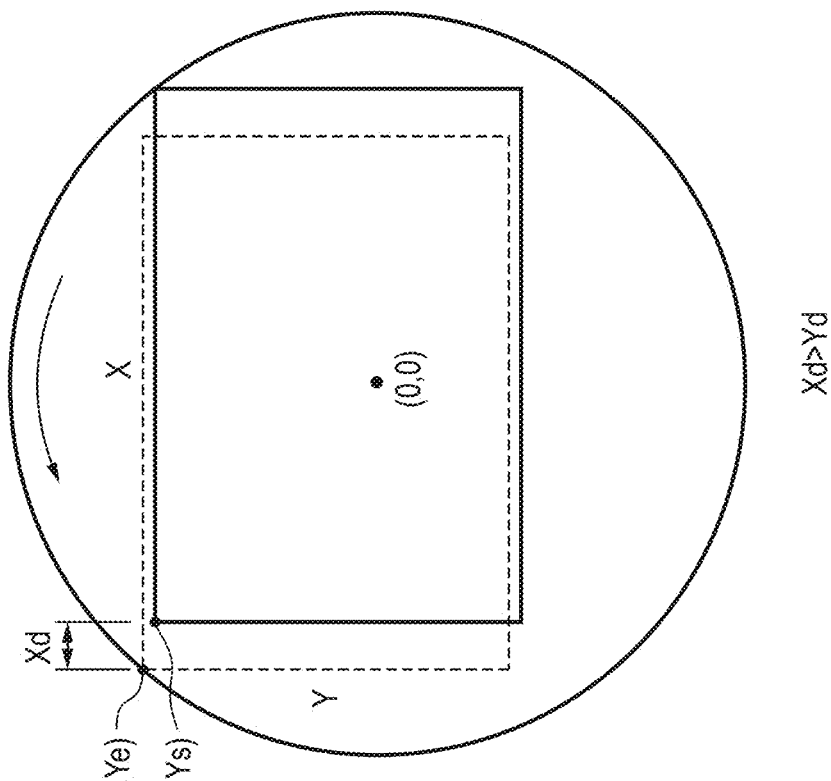
FIGS. 9A and 9B are diagrams showing an example of movement of an image sensor during the calibration operation according to the first embodiment.
Figure 9A:
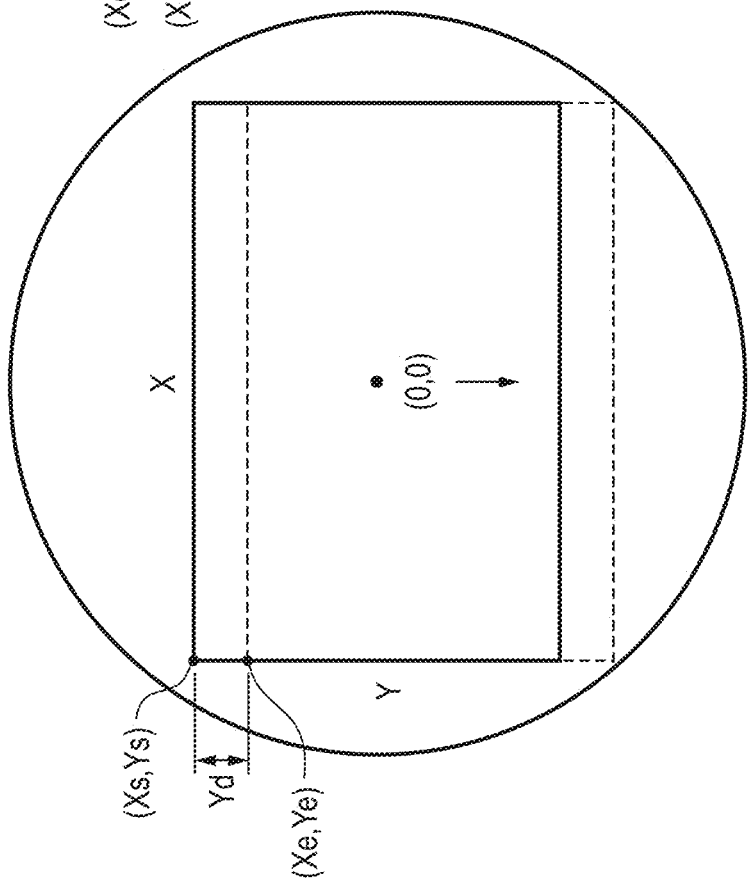

FIG. 9A is an example showing the movement of the image sensor 101 when Yd>Xd, and specifically shows an example when the image sensor 101 is moved downward by the calibration operation. FIG. 9B shows an example when Xd>Yd, and specifically shows an example when the image sensor is moved to the left by the calibration operation.

Here, if it is determined in step S803 that Xd>Yd, the process proceeds to step S804, a horizontal division flicker detection process is performed, and the process ends. The horizontal division flicker detection process will be described later with reference to FIGS. 10 and 11.

On the other hand, if it is not determined in step S803 that Xd>Yd, the process proceeds to step S805, a vertical division flicker detection process is performed, and the process ends. The vertical division flicker detection process will be described later with reference to FIGS. 12 and 13.

In this way, according to the judgment of step S803, it is possible to determine whether the subject continuously appearing in the 12 frames of images is moving horizontally or vertically relative to the image sensor 101 by the calibration operation of the image sensor type image stabilization unit 105. Based on the determination of the moving direction (shift direction), a region is selected such that one side of the photometric region for flicker detection parallel to the moving direction becomes longer. As a result, the amount of change in the area of the common region due to the relative movement of the subject and the image sensor 101 is reduced. Further, by selecting such a region, it is possible to reduce the change in ambient light due to the change in brightness of 12 consecutive frames of images.

Figure 10:
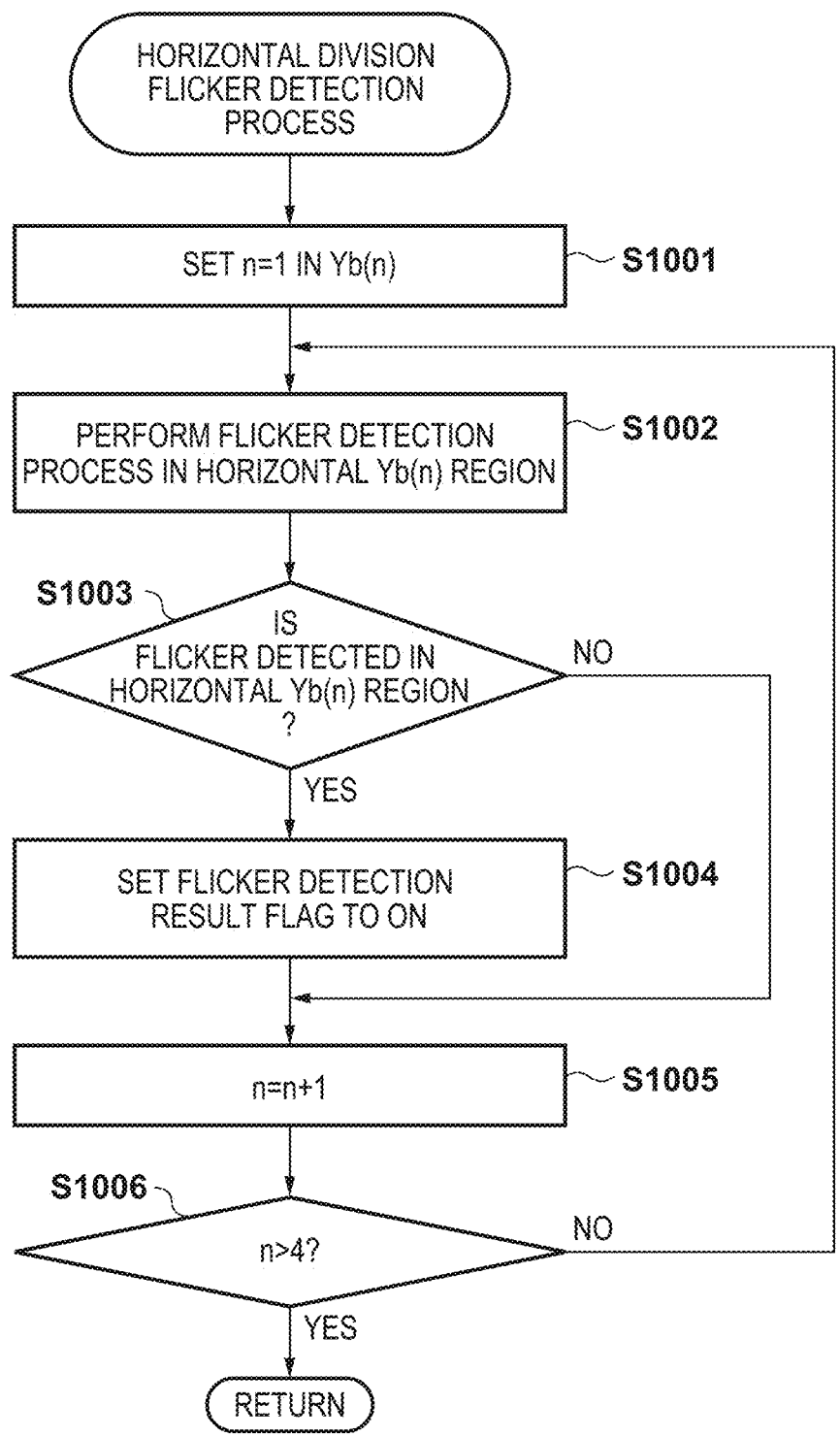
FIG. 10 is a flowchart of a horizontal division flicker detection process according to the first embodiment.

Next, the horizontal division flicker detection process according to the first embodiment will be described with reference to the flowchart shown in FIG. 10. Here, as an example, it is assumed that each image is divided into 16 blocks as described with reference to FIG. 7, and a case where each image is segmented into four regions with long side in the horizontal direction will be described.

First, in step S1001, each of the 12 frames of images is segmented into four regions with long side in the horizontal direction, and n of Yb(n) indicating a block region shown in FIG. 7 is initialized to 1 in order to sequentially detect flicker in each region.

Figure 11:
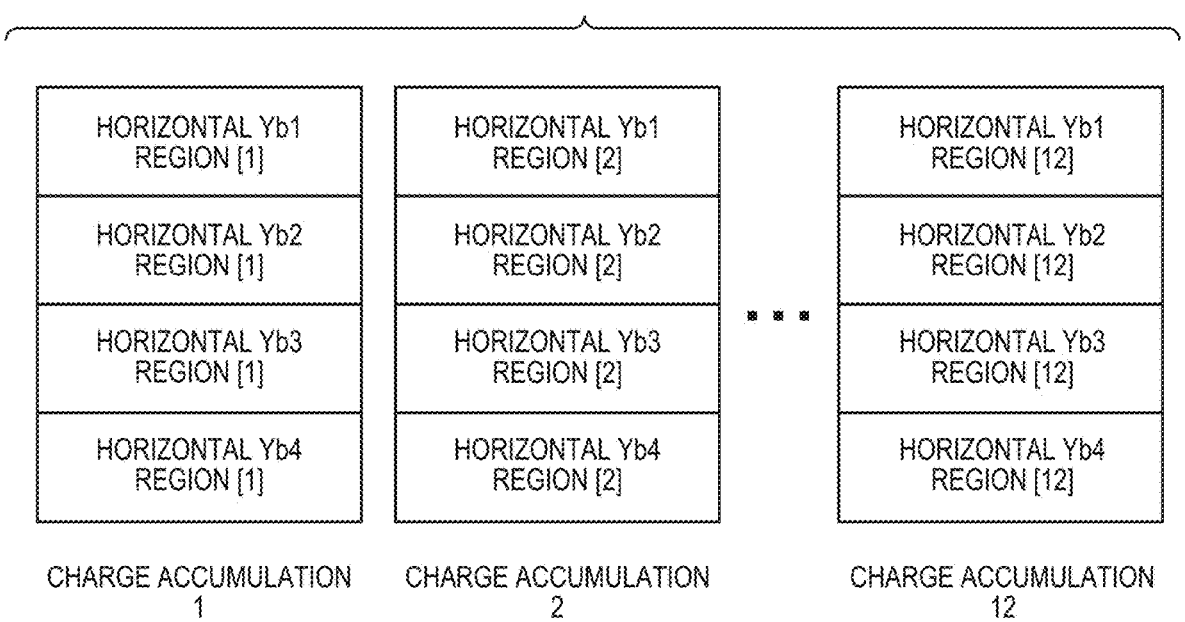
FIG. 11 is a diagram showing an example of horizontally divided regions according to the first embodiment.

Next, in step S1002, the block division regions with n=1, namely, (Xb1, Yb1), (Xb2, Yb1), (Xb3, Yb1), and (Xb4, Yb1) described in FIG. 7 are laterally combined as a horizontal Yb1 region shown in FIG. 11 and a flicker determination process is performed on the horizontal Yb1 region. In FIG. 11 and the following description, the number in parentheses after the horizontal Yb1 region represents the number of frame. In the present embodiment, since 12 consecutive frames are used, evaluation values of horizontal Yb1 region [1] to horizontal Yb1 region [12], that is, 4×12=48 evaluation values are obtained by the process of step S604 in FIG. 6. The flicker determination is performed using the evaluation values of the horizontal Yb1 region [1] to the horizontal Yb1 region [12], and whether flicker occurs and the frequency of the flicker are determined. Since the details of the flicker detection method are known, the description thereof will be omitted.

Next, in step S1003, it is determined whether or not flicker is detected in the horizontal Yb(n) region, and if it is not detected, the process proceeds to step S1005, and if it is detected, the process proceeds to step S1004 and a flicker detection result flag is set to On, and then process proceeds to step S1005.

In step S1005, n is incremented by 1 and the process proceeds to step S1006. In step S1006, the process returns to step S1002 and the processes described above are repeated until it is determined that n is larger than the preset number of segmentation (n>4 in this case), and when it is determined that n>4, the process ends.

In this way, in the horizontal division flicker detection process, in each of the four regions for flicker detection, it is possible to reduce an amount of change in common region between frames caused by the relative movement between the subject and the image sensor 101 due to the calibration operation of the image sensor type image stabilization unit 105.

Figure 12:
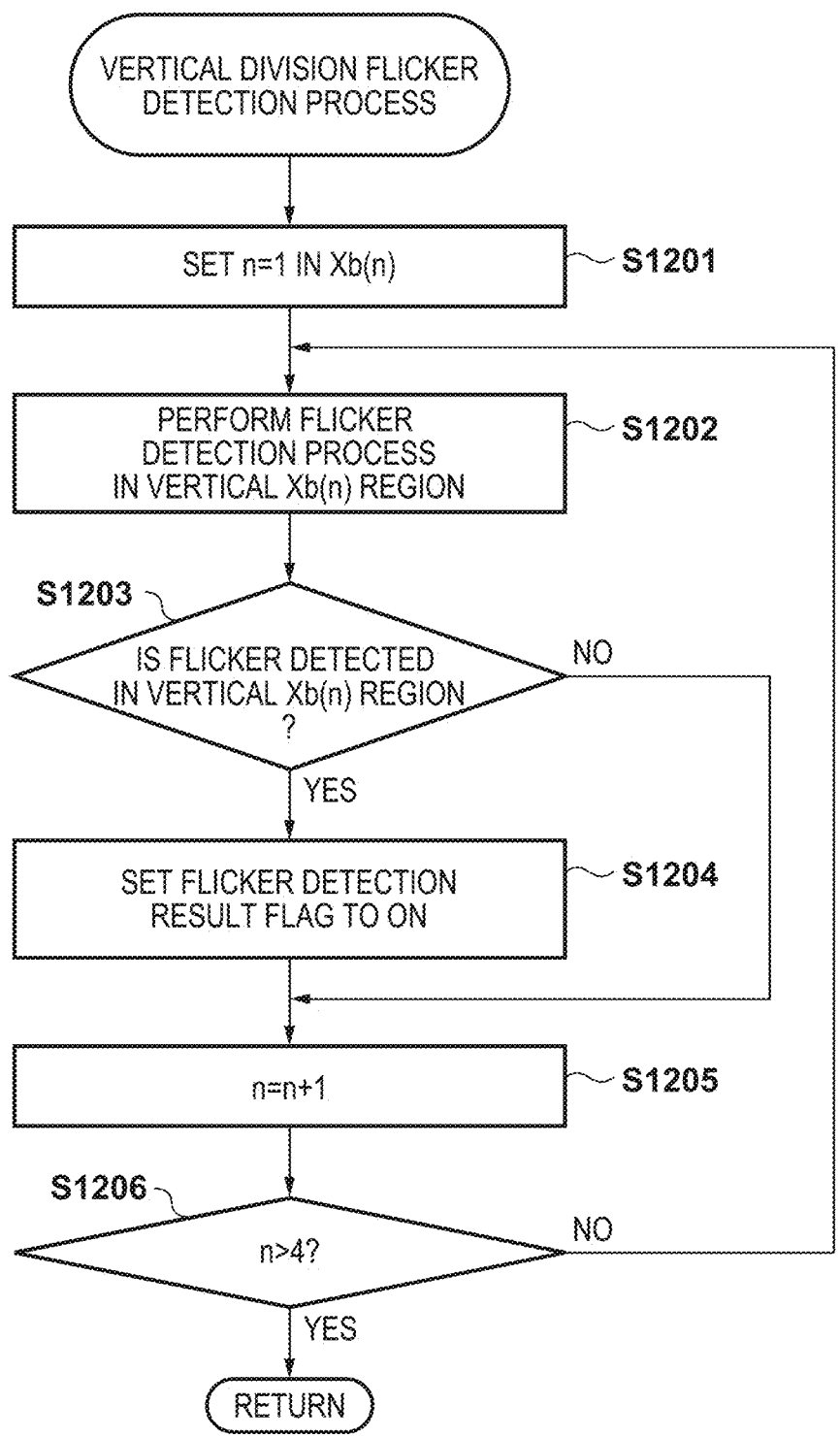
FIG. 12 is a flowchart of a vertical division flicker detection process according to the first embodiment.

Next, the vertical division flicker detection process according to the first embodiment will be described with reference to the flowchart shown in FIG. 12. Here, as an example, it is also assumed that each image is divided into 16 blocks as described with reference to FIG. 7, and a case where each image is segmented into four regions with long side in the vertical direction will be described.

First, in step S1201, each of the 12 frames of images is segmented into four regions with long side in the vertical direction, and n of Xb(n) indicating a block region shown in FIG. 7 is initialized to 1 in order to sequentially detect flicker in each region.

Figure 13:
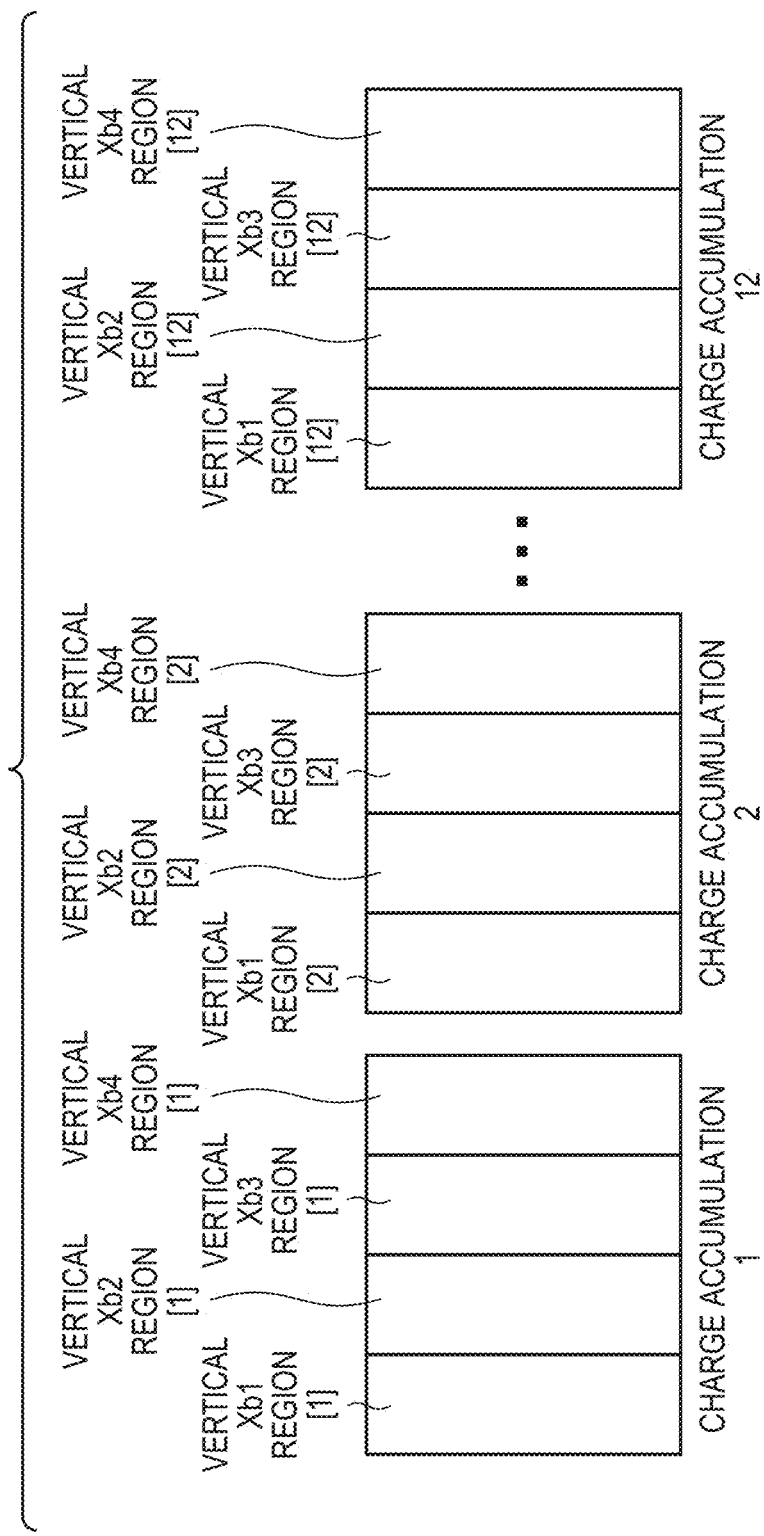
FIG. 13 is a diagram showing an example of vertically divided regions according to the first embodiment.

Next, in step S1202, the block division regions with n=1, namely, (Xb1, Yb1), (Xb1, Yb2), (Xb1, Yb3), and (Xb1, Yb4) described in FIG. 7 are vertically combined as shown in FIG. 13 and a flicker determination process is performed on a vertical Xb1 region. In FIG. 13 and the following description, the number in parentheses after the vertical Xb1 region represents the number of the frame. In the present embodiment, since 12 consecutive frames are used, evaluation values of vertical Xb1 region [1] to vertical Xb1 region [12], that is, 4×12=48 evaluation values are obtained by the process of step S604 in FIG. 6. The flicker determination is performed using the evaluation values of the vertical Xb1 region [1] to the vertical Xb1 region [12], and whether flicker occurs and the frequency of the flicker are determined. Since the details of the flicker detection method are known, the description thereof will be omitted.

Next, in step S1203, it is determined whether or not flicker is detected in the vertical Xb(n) region, and if it is not detected, the process proceeds to step S1205, and if it is detected, the process proceeds to step S1204 and a flicker detection result flag is set to On, and then process proceeds to step S1205.

In step S1205, n is incremented by 1 and the process proceeds to step S1206. In step S1206, the process returns to step S1202 and the processes described above are repeated until it is determined that n is larger than the preset number of segmentation (n>4 in this case), and when it is determined that n>4, the process ends.

In this way, in the vertical division flicker detection process, in each of the four regions for flicker detection, it is possible to reduce an amount of change in common region between frames caused by the relative movement between the subject and the image sensor 101 due to the calibration operation of the image sensor type image stabilization unit 105.

As described above, according to the first embodiment, even when the position on the image sensor of the subject image incident on the image sensor is shifted due to the calibration operation for image stabilization, it is possible to perform flicker detection on the entire image without impairing the responsiveness and real-time performance.

In the present embodiment, an image is taken at 600 fps for flicker detection, and 12 frames of images are taken. However, the disclosure is not limited to these, and the disclosure can be changed as appropriate depending on the ability of the image sensor.

Further, in the present embodiment, the case where the image is segmented into four in the horizontal direction or the vertical direction for flicker detection according to the moving direction during the calibration operation for image stabilization isolation has been described, but the present disclosure is not limited to this. For example, each image may be divided into two, or when each image is divided into larger number of blocks, the number of segments may be appropriately set according to the number of the blocks.

Second Embodiment

Next, a second embodiment of the disclosure will be described. Since the image capturing apparatus in the second embodiment is the same as that shown in FIG. 1, description thereof will be omitted here.

In the second embodiment, flicker is detected during the calibration operation of the lens type image stabilization unit 204. The lens type image stabilization unit 204 performs the calibration operation by driving the correction lens included in the lens group 201 in the same manner as the image sensor type image stabilization unit 105 in the first embodiment described above.

Further, the outline of the flicker detection processing during the calibration operation of the lens type image stabilization unit 204 in the second embodiment is the same as that in the first embodiment described with reference to FIG. 5. The difference is that the lens type image stabilization unit 204 is calibrated instead of the image sensor type image stabilization unit 105, so the description is omitted. Since the details of the evaluation value acquisition process in step S503 are different, the process in step S503 will be described below.

Figure 14:
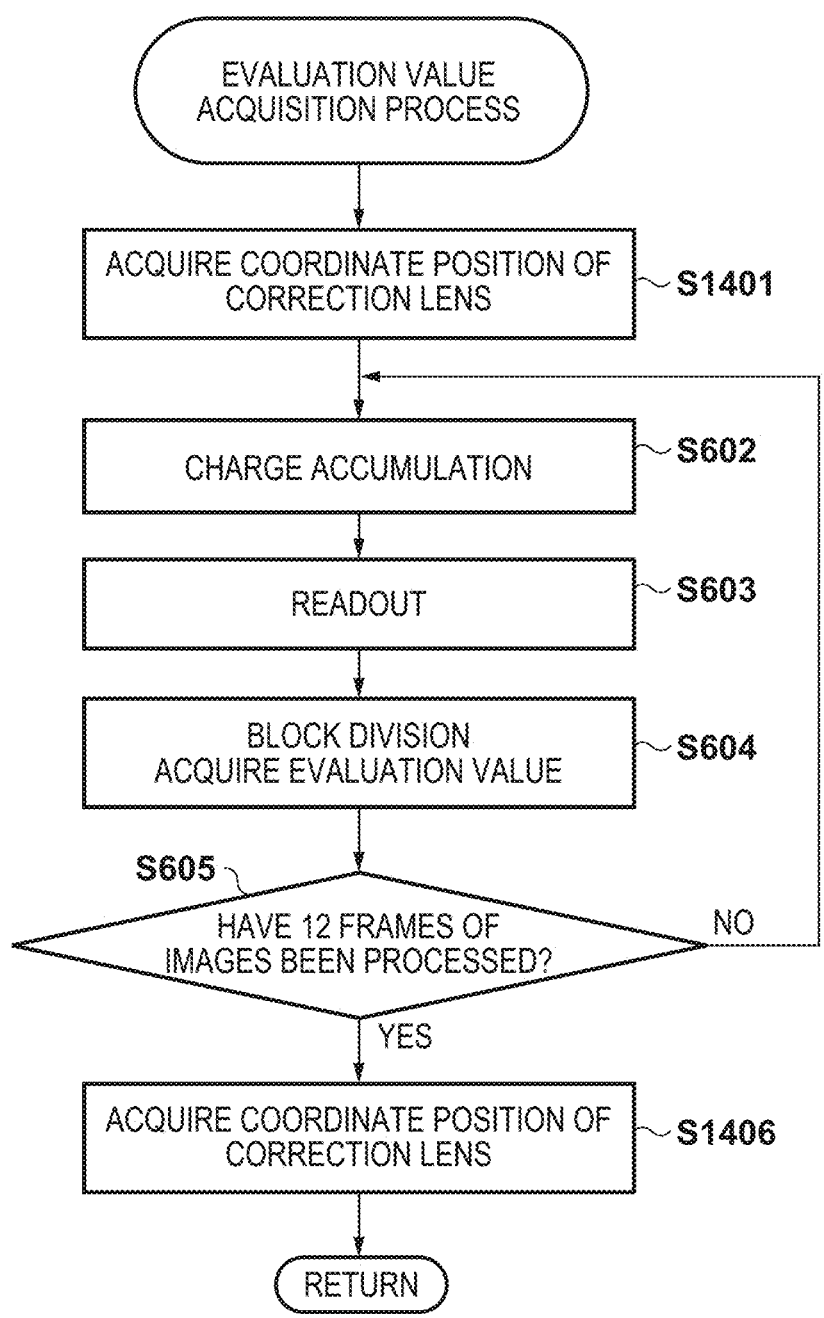
FIG. 14 is a flowchart of an evaluation value acquisition process according to a second embodiment.

FIG. 14 is a diagram illustrating an evaluation value acquisition process performed in step S503 of FIG. 5 in the second embodiment. The difference from the evaluation value acquisition process described with reference to FIG. 6 in the first embodiment is the following two points. First, in step S1401, the coordinate position indicating the current position of the correction lens shifted by the calibration operation of the lens type image stabilization unit 204 is acquired. Further, in step S1406, the coordinate position indicating the current position of the correction lens shifted by the calibration operation of the lens type image stabilization unit 204 started in step S502 is acquired. The coordinate positions of the correction lens at the start and end of the evaluation value acquisition process acquired here are used in the region selection flicker detection process described above with reference to FIG. 8.

Since the processes other than these are the same as the processes described with reference to FIG. 6, the same step numbers are assigned and the description thereof will be omitted.

As described above, according to the second embodiment, the same effect as that of the first embodiment can be obtained even when the lens type image stabilization unit 204 is used for image stabilization.

When image stabilization is performed using both the image sensor type image stabilization unit 105 and the lens type image stabilization unit 204, the flicker detection process may be performed while the calibrations of one of these units is being performed.

Other Embodiments

The disclosure may be applied to a system composed of a plurality of devices or an apparatus composed of a single device.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese 2021 Patent Application No. 2020-087603, filed on May 19, 2020 which is hereby incorporated by reference herein in its entirety.

What is claimed is:

1. An apparatus comprising:
at least one processor; and
a memory coupled to the at least one processor, the memory having instructions that, when executed by the processor, performs operations as:
a sensor that shoots a subject and outputs an image;
a shift unit that shifts a position on the sensor of an image of the subject incident on the sensor; and
a detection unit that detects flicker based on images in a same partial region of a plurality of images consecutively obtained from the sensor,
wherein in a case where the sensor shoots the plurality of images while the shift unit is shifting the position of the image of the subject, the detection unit selects the same partial region so that a change of the image of the subject in the same partial region caused by the shift becomes small between the plurality of images.

2. The apparatus according to claim 1 further comprising a determination unit that determines a shift direction of the position caused by the shift unit,
wherein the detection unit selects the same partial region based on the determined shift direction, and
wherein the determination unit is implemented by one or more processors, circuitry or a combination thereof.

3. The apparatus according to claim 2, wherein the detection unit selects the same partial region so that a side of the same partial region that is parallel with the shift direction is longer than other sides.

4. The apparatus according to claim 2, wherein the detection unit divides each of the plurality of images into a plurality of regions with long side in the shift direction, and selects one of the plurality of divided regions as the same partial region.

5. The apparatus according to claim 1, wherein the shift unit is a stabilization unit,
wherein the stabilization unit is implemented by one or more processors, circuitry or a combination thereof.

6. The apparatus according to claim 5, wherein the shift unit shifts the sensor.

7. The apparatus according to claim 5, wherein the shift unit shifts a lens included in a lens group for forming the image of the subject on the sensor.

8. The apparatus according to claim 1, wherein the plurality of images are shot during a calibration operation of the shift unit.

9. The apparatus according to claim 1 further comprising a display device,
wherein in a case where flicker is detected by the detection unit, information indicative of flicker being detected is displayed on the display device.

10. A method of an apparatus that comprises a sensor that shoots a subject and outputs an image and a shift unit that shifts a position on the sensor of an image of the subject incident on the sensor, the method comprising:
shooting a plurality of images by the sensor while the shift unit is shifting the position of the image of the subject,
selecting a same partial region of the plurality of images so that a change of the image of the subject in the same partial region caused by the shift becomes small between the plurality of images; and
detecting flicker based on images in the selected same partial region of the plurality of images.

11. The method according to claim 10 further comprising determining a shift direction of the position caused by the shift unit,
wherein the detecting selects the same partial region based on the determined shift direction.

12. The method according to claim 10, wherein the shift unit is a stabilization unit.

13. The method according to claim 10, wherein the plurality of images are shot during a calibration operation of the shift unit.

14. The method according to claim 10, wherein the apparatus further comprises a display device,
wherein in a case where flicker is detected by the detecting, information indicative of flicker being detected is displayed on the display device.

15. A non-transitory computer-readable storage medium, the storage medium storing a program that is executable by the computer, wherein the program includes program code for causing the computer to perform a method of an apparatus that comprises a sensor that shoots a subject and outputs an image and a shift unit that shifts a position on the sensor of an image of the subject incident on the sensor, the method comprising:
shooting a plurality of images by the sensor while the shift unit is shifting the position of the image of the subject,
selecting a same partial region of the plurality of images so that a change of the image of the subject in the same partial region caused by the shift becomes small between the plurality of images; and
detecting flicker based on images in the selected same partial region of the plurality of images.

16. The non-transitory computer-readable storage medium according to claim 15, wherein the method further comprising determining a shift direction of the position caused by the shift unit,
wherein the detecting selects the same partial region based on the determined shift direction.

17. The non-transitory computer-readable storage medium according to claim 15, wherein the shift unit is a stabilization unit.

18. The non-transitory computer-readable storage medium according to claim 15, wherein the plurality of images are shot during a calibration operation of the shift unit.

19. The non-transitory computer-readable storage medium according to claim 15, wherein the apparatus further comprises a display device,
- wherein in a case where flicker is detected by the detecting, information indicative of flicker being detected is displayed on the display device.

* * * * *